L. C. RODIER & F. G. BATES.
Stop-Cocks.

No. 144,700.

Patented Nov. 18, 1873.

Witnesses.

Louis C. Rodier & Francis G. Bates
Inventors
By Atty.

UNITED STATES PATENT OFFICE.

LOUIS C. RODIER AND FRANCIS G. BATES, OF SPRINGFIELD, MASS.

IMPROVEMENT IN STOP-COCKS.

Specification forming part of Letters Patent No. 144,700, dated November 18, 1873; application filed March 7, 1873.

*To all whom it may concern:*

Be it known that we, LOUIS C. RODIER and FRANCIS G. BATES, of Springfield, in the county of Hampden and State of Massachusetts, have invented a new Improvement in Water-Cocks; and we do hereby declare the following, when taken in connection with the accompanying drawings and the letters of reference marked thereon, to be a full, clear, and exact description of the same, and which said drawings constitute part of this specification, and represent, in—

Figure 1:
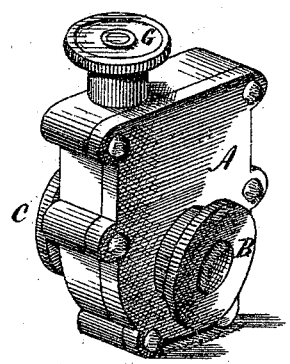
Figure 2:
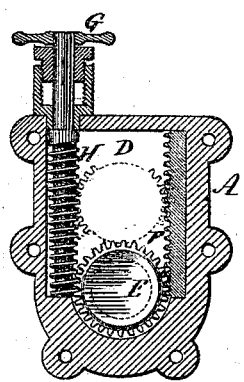

Figure 1, a perspective view; and in Fig. 2, a vertical central section.

This invention relates to an improvement in cocks or gates designed for water-pipes and for like purposes, the object being to impart to the gate a rotary movement transversely across the opening for the flow; and the invention consists in the arrangement of a gate transversely across the water-way, combined with mechanism to impart to the said gate, in opening or closing, a rotary movement, the axis of such movement being substantially parallel to the axis of the water-way.

We have represented this cock as constructed for application to pipes; but it is applicable to common water-cocks or faucets, or to other purposes where it is desirable to cut off or open a passage for the flow of fluids or liquids, it only being necessary to form the inlet or outlet according to the purpose desired.

A is the case, of any required form, constructed with an inlet, B, and outlet C. Within this case the valve-chamber D is formed, and in the chamber the valve E is set. Upon the edge of the valve a series of teeth, as in the form of a gear, is made or attached, as seen in Fig. 2; and upon one side of the chamber a rack, F, is formed, the teeth of which correspond to the teeth on the valve, so that as the valve is raised vertically, or in a line parallel with the rack, the teeth of the valve in such movement, meshing into the teeth of the rack, will cause the valve to rotate as it moves, the axis of rotation being substantially parallel with the water-way.

The valve is best operated by an endless screw, H, arranged to extend through the case, and provided with suitable means G for turning. The threads of the screw work in the teeth on the valve, so that, as the screw is turned in one direction, it will move the valve from the opening, as up to the position denoted in broken lines, Fig. 2, and, in the other direction, will return or close the valve, the valve rotating, as before described, transversely across the water-way, or the axis of rotation being substantially parallel with the water-way.

While we believe this to be the best method of operating the valve, and especially so for the larger class of valves, it may be desirable, in smaller cocks or valves, to move the valve with greater rapidity. Other attachments, therefore, may be applied to the valve to open or close the water-way; but, whatever that arrangement may be, the rack or stationary teeth will impart to the valve a rotary movement, which, combined with the transverse movement, gives to the valve, in closing, a shearing movement across the valve-seat, which would be sufficient to cut off any obstacle which would be liable to work its way into the pipes.

Another great advantage of this construction is the leverage which is afforded in the movement of the valve to work it against the pressure which is naturally brought upon it.

We claim as our invention—

The valve E, arranged in a chamber transversely to the water-way, constructed and combined with a rack, F, and means for imparting a transverse movement to the valve, so that, in the movement of the valve, a combined transverse and rotary movement is imparted thereto, substantially as set forth.

LOUIS C. RODIER.
FRANCIS G. BATES.

Witnesses:
J. W. BROWNE,
C. L. HUBBARD.